(12) United States Patent
Mesecher

(10) Patent No.: US 7,684,469 B2
(45) Date of Patent: *Mar. 23, 2010

(54) CODE DIVISION MULTIPLE ACCESS TRANSMISSION ANTENNA WEIGHTING

(75) Inventor: David K Mesecher, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/567,498

(22) Filed: Dec. 6, 2006

(65) Prior Publication Data

US 2007/0091985 A1    Apr. 26, 2007

Related U.S. Application Data

(63) Continuation of application No. 11/315,795, filed on Dec. 22, 2005, which is a continuation of application No. 10/068,718, filed on Feb. 6, 2002, now Pat. No. 6,983,008, which is a continuation of application No. 09/602,963, filed on Jun. 23, 2000, now Pat. No. 6,373,877, which is a continuation of application No. 09/394,452, filed on Sep. 10, 1999, now Pat. No. 6,115,406.

(51) Int. Cl.
*H04K 1/00* (2006.01)
(52) U.S. Cl. ...................... 375/147; 375/130
(58) Field of Classification Search ................ 375/130, 375/147, 219, 267, 347; 370/335, 342; 455/69, 455/67.1

See application file for complete search history.

(56) References Cited

U.S. PATENT DOCUMENTS 3,662,268 A    5/1972    Gans et al.

(Continued)

FOREIGN PATENT DOCUMENTS

EP    0 674 455    10/1994

(Continued)

OTHER PUBLICATIONS

Pahlavan et al., "Performance of Adaptive Matched Filter Receivers Over Fading Multipath Channels," IEEE Transactions on Communications, vol. 38, No. 12, Dec. 1990, pp. 2106-2113.

(Continued)

*Primary Examiner*—Temesghen Ghebretinsae
(74) *Attorney, Agent, or Firm*—Volpe and Koenig, P.C.

(57) ABSTRACT

A code division multiple access communication system has a base station with a plurality of transmitting antennas. From each transmitting antenna of the base station, a pilot signal is transmitted having a different chip sequence than the other transmitting antenna. At a user equipment, the transmitted pilot signals are received from each transmitting antenna. A weight adjustment is derived in response to the received transmitted pilot signals. The user equipment transmits the weight adjustment to the base station. The transmitted weight adjustment is received from the user equipment. A data signal is processed to produce a plurality of versions of the data signal. At least a portion of each processed data signal has a different chip sequence than the other processed data signal version. At least one processed data signal version is weighted by a weight value adjusted in response to the received transmitted weight adjustment. From each transmitting antenna, a different one of the data signal versions is transmitted and the transmitted data signal versions are received at the user equipment.

14 Claims, 20 Drawing Sheets

U.S. PATENT DOCUMENTS

| | | | |
|---|---|---|---|
| 4,736,460 A | 4/1988 | Rilling | |
| 4,901,307 A | 2/1990 | Gilhousen et al. | |
| 5,146,475 A | 9/1992 | Kubo | |
| 5,319,677 A | 6/1994 | Kim | |
| 5,331,666 A | 7/1994 | Dent | |
| 5,381,443 A | 1/1995 | Borth et al. | |
| 5,457,704 A | 10/1995 | Hoeher et al. | |
| 5,493,563 A | 2/1996 | Rozanski et al. | |
| 5,623,511 A | 4/1997 | Bar-David et al. | |
| 5,652,764 A | 7/1997 | Kanzaki et al. | |
| 5,673,294 A | 9/1997 | Namekata | |
| 5,680,419 A | 10/1997 | Bottomley | |
| 5,694,388 A | 12/1997 | Sawahashi et al. | |
| 5,757,791 A | 5/1998 | Kanterakis et al. | |
| 5,809,020 A * | 9/1998 | Bruckert et al. | 370/335 |
| 5,812,542 A | 9/1998 | Bruckert et al. | |
| 5,822,380 A | 10/1998 | Bottomley | |
| 5,822,701 A | 10/1998 | Tomisato et al. | |
| 5,886,987 A | 3/1999 | Yoshida et al. | |
| 5,903,834 A | 5/1999 | Wallstedt et al. | |
| 5,952,968 A | 9/1999 | McDowell | |
| 5,982,327 A | 11/1999 | Vook et al. | |
| 5,991,332 A | 11/1999 | Lomp et al. | |
| 6,009,074 A | 12/1999 | Kim et al. | |
| 6,026,130 A | 2/2000 | Rahmatullah et al. | |
| 6,044,120 A | 3/2000 | Bar-David et al. | |
| 6,067,324 A * | 5/2000 | Harrison | 375/267 |
| 6,069,884 A | 5/2000 | Hayashi et al. | |
| 6,081,566 A | 6/2000 | Molnar et al. | |
| 6,108,517 A | 8/2000 | Arslan et al. | |
| 6,147,985 A | 11/2000 | Bar-David et al. | |
| 6,148,041 A | 11/2000 | Dent | |
| 6,154,443 A | 11/2000 | Huang et al. | |
| 6,160,801 A | 12/2000 | Uchida et al. | |
| 6,161,209 A | 12/2000 | Moher | |
| 6,215,762 B1 | 4/2001 | Dent | |
| 6,335,954 B1 | 1/2002 | Bottomley et al. | |
| 6,385,181 B1 * | 5/2002 | Tsutsui et al. | 370/335 |
| 6,434,366 B1 * | 8/2002 | Harrison et al. | 455/69 |
| 6,459,740 B1 | 10/2002 | Lo | |
| 6,470,047 B1 | 10/2002 | Kleinerman et al. | |
| 6,470,192 B1 | 10/2002 | Karlsson et al. | |
| 6,483,866 B1 | 11/2002 | Suzuki | |
| 6,484,285 B1 | 11/2002 | Dent | |
| 6,501,788 B1 | 12/2002 | Wang et al. | |
| 6,501,803 B1 | 12/2002 | Alamouti et al. | |
| 6,556,634 B1 | 4/2003 | Dent | |
| 6,647,070 B1 | 11/2003 | Shalvi et al. | |
| 6,694,154 B1 | 2/2004 | Molnar et al. | |
| 6,697,441 B1 | 2/2004 | Bottomley et al. | |
| 6,731,700 B1 | 5/2004 | Yakhnich et al. | |
| 6,870,825 B1 | 3/2005 | Huang | |
| 2001/0030993 A1 | 10/2001 | Bottomley et al. | |
| 2002/0003846 A1 | 1/2002 | Khayrallah et al. | |
| 2002/0122510 A1 | 9/2002 | Yakhnich et al. | |
| 2002/0150187 A1 | 10/2002 | Chugg et al. | |
| 2002/0154704 A1 | 10/2002 | Reshef | |
| 2002/0181430 A1 | 12/2002 | Thomas et al. | |
| 2003/0013468 A1 | 1/2003 | Khatri | |
| 2003/0053524 A1 | 3/2003 | Dent | |
| 2003/0058929 A1 | 3/2003 | Cox et al. | |
| 2003/0092456 A1 | 5/2003 | Dent | |

FOREIGN PATENT DOCUMENTS

| | | |
|---|---|---|
| EP | 0674455 | 9/1995 |
| EP | 0 715 421 | 6/1996 |
| EP | 0715421 | 6/1996 |
| EP | 0 755 127 | 1/1997 |
| EP | 0755127 | 1/1997 |
| EP | 0 820 157 | 1/1998 |
| EP | 0820157 | 1/1998 |
| EP | 0 881 781 | 12/1998 |
| EP | 0881781 | 12/1998 |
| EP | 0 892 508 | 1/1999 |
| EP | 0892508 | 1/1999 |
| EP | 0 899 894 | 3/1999 |
| EP | 0899894 | 3/1999 |
| GB | 2 280 575 | 2/1995 |
| GB | 2280575 | 2/1995 |
| JP | H09-261204 | 10/1997 |
| JP | H11-186991 | 7/1999 |
| WO | 94/01956 | 1/1994 |
| WO | 94001956 | 1/1994 |
| WO | 95/34140 | 12/1995 |
| WO | 95034140 | 12/1995 |
| WO | 96/11533 | 4/1996 |
| WO | 96011533 | 4/1996 |
| WO | 96/21295 | 7/1996 |
| WO | 97/13386 | 4/1997 |
| WO | 97013386 | 4/1997 |
| WO | 99/04537 | 1/1999 |
| WO | 99004537 | 1/1999 |
| WO | 99/12283 | 3/1999 |
| WO | 99012283 | 3/1999 |
| WO | 99/23767 | 5/1999 |
| WO | 99/52311 | 10/1999 |
| WO | 99052311 | 10/1999 |
| WO | 00/35159 | 6/2000 |
| WO | 00035159 | 6/2000 |
| WO | 00/44141 | 7/2000 |
| WO | 00044141 | 7/2000 |
| WO | 00/48330 | 8/2000 |
| WO | 00048330 | 8/2000 |
| WO | 00/69192 | 11/2000 |
| WO | 00069192 | 11/2000 |
| WO | 01/05088 | 1/2001 |
| WO | 01005088 | 1/2001 |
| WO | 01/28174 | 4/2001 |
| WO | 01028174 | 4/2001 |
| WO | 01/45289 | 6/2001 |
| WO | 01045289 | 6/2001 |
| WO | 02/09297 | 1/2002 |
| WO | 02009297 | 1/2002 |
| WO | 02/23787 | 3/2002 |
| WO | 02023787 | 3/2002 |
| WO | 02/065719 | 8/2002 |
| WO | 02/067444 | 8/2002 |
| WO | 02065719 | 8/2002 |
| WO | 02067444 | 8/2002 |
| WO | 02/084892 | 10/2002 |
| WO | 02084892 | 10/2002 |
| WO | 03/03604 | 1/2003 |
| WO | 03003604 | 1/2003 |
| WO | 03/010899 | 2/2003 |
| WO | 03010899 | 2/2003 |
| WO | 2004/012341 | 2/2004 |
| WO | 2004012341 | 2/2004 |

OTHER PUBLICATIONS

Latva-aho et al., "LMMSE Detection for DS-CDMA Systems in Fading Channels," IEEE Transactions on Communications, vol. 48, No. 2, Feb. 2000, 194-199.

Majmundar et al., "Adaptive Single-User Receivers for Direct-Sequence Spread-Spectrum CDMA Systems," IEEE Transactions on Vehicular Technology, vol. 49, No. 2, Mar. 2000, pp. 379-389.

Foerster et al., "Coding for a Coherent DS-CDMA System Employing an MMSE Receiver in a Rayleigh Fading Channel," IEEE Transactions on Communications, vol. 48, No. 6, Jun. 2000, pp. 1012-1021.

Foerster et al., "Coding for a Coherent DS-CDMA System Employing an MMSE Receiver in a Rayleigh Fading Channel," IEEE Transactions on Communications, vol. 48, No. 6, Jun. 2000, pp. 1012-1021.

Latva-aho et al., "LMMSE Detection for DS-CDMA Systems in Fading Channels," IEEE Transactions on Communications, vol. 48, No. 2, Feb. 2000, 194-199.

Majmundar et al., "Adaptive Single-User Receivers for Direct-Sequence Spread-Spectrum CDMA Systems," IEEE Transactions on Vehicular Technology, vol. 49, No. 2, Mar. 2000, pp. 379-389.

Pahlavan et al., "Performance of Adaptive Matched Filter Receivers Over Fading Multipath Channels," IEEE Transactions on Communications, vol. 38, No. 12, Dec. 1990, pp. 2106-2113.

Third Generation Partnership Project, "Technical Specification Group Radio Access Network; Physical layer procedures (TDD) (Release 1999)," 3GPP TS 25.224 V1.0.0 (Apr. 1999).

Third Generation Partnership Project, "Technical Specification Group Radio Access Network; Physical layer procedures (TDD) (Release 1999)," 3GPP TS 25.224 V3.2.0 (Mar. 2000).

Third Generation Partnership Project, "Technical Specification Group Radio Access Network; Spreading and modulation (TDD) (Release 1999)," 3GPP TS 25.223 V2.1.0 (Jun. 1999).

Third Generation Partnership Project, "Technical Specification Group Radio Access Network; Spreading and modulation (TDD) (Release 1999)," 3GPP TS 25.223 V3.2.0 (Mar. 2000).

Third Generation Partnership Project, "Technical Specification Group Radio Access Network; Physical channels and mapping of transport channels onto physical channels (TDD) (Release 4)," 3GPP TS 25.221 V1.1.0 (Jun. 1999).

Third Generation Partnership Project, "Technical Specification Group Radio Access Network; Physical channels and mapping of transport channels onto physical channels (TDD) (Release 4)," 3GPP TS 25.221 V3.2.0 (Mar. 2000).

Third Generation Partnership Project, "Technical Specification Group Radio Access Network; Physical Channels and Mapping of Transport Channels onto Physical Channels (FDD) (Release 1999)," 3GPP TS 25.211 V2.1.0 (Jun. 1999).

Third Generation Partnership Project, "Technical Specification Group Radio Access Network; Physical Channels and Mapping of Transport Channels onto Physical Channels (FDD) (Release 1999)," 3GPP TS 25.211 V3.1.0 (Dec. 1999).

Third Generation Partnership Project, "Technical Specification Group Radio Access Network; Spreading and modulation (FDD) (Release 1999)," 3GPP TS 25.213 V2.1.0 (Jun. 1999).

Third Generation Partnership Project, "Technical Specification Group Radio Access Network; Spreading and modulation (FDD) (Release 1999)," 3GPP TS 25.213 V3.2.0 (Mar. 2000).

Third Generation Partnership Project, "Technical Specification Group Radio Access Network; Physical Layer Procedures (FDD) (Release 1999)." 3GPP TS 25.214 v3.2.0 (Mar. 2000).

Third Generation Partnership Project, "Technical Specification Group Radio Access Network; Physical Layer Procedures (FDD) (Release 1999)." 3GPP TS 25.214 v1.0.0 (Apr. 1999).

Third Generation Partnership Project, "Technical Specification Group Radio Access Network; Base Station (BS) radio transmission and reception (FDD)," 3GPP TS 25.104 V2.0.0 (Jun. 1999).

Third Generation Partnership Project, "Technical Specification Group Radio Access Network; Base Station (BS) radio transmission and reception (FDD)," 3GPP TS 25.104 V3.2.0 (Mar. 2000).

Third Generation Partnership Project, "Technical Specification Group Radio Access Network; User Equipment (UE) radio transmission and reception (FDD)," 3GPP TS 25.101 V2.0.0 (Jun. 1999).

Third Generation Partnership Project, "Technical Specification Group Radio Access Network; User Equipment (UE) radio transmission and reception (FDD)," 3GPP TS 25.101 V3.2.2 (Apr. 2000).

* cited by examiner

CODE DIVISION MULTIPLE ACCESS TRANSMISSION ANTENNA WEIGHTING

CROSS REFERENCE TO RELATED APPLICATIONS

This application is a continuation application of U.S. patent application Ser. No. 11/315,795, filed Dec. 22, 2005, which is a continuation of U.S. patent application Ser. No. 10/068,718 filed Feb. 6, 2002; now U.S. Pat. No. 6,983,008 issued on Jan. 3, 2006, which is a continuation of U.S. patent application Ser. No. 09/602,963, filed Jun. 23, 2000, now U.S. Pat. No. 6,373,877 issued on Apr. 16, 2002; which is a continuation of U.S. patent application Ser. No. 09/394,452 filed Sep. 10, 1999, now U.S. Pat. No. 6,115,406 issued on Sep. 5, 2000, all of which are incorporated by reference as if fully set forth.

FIELD OF THE INVENTION

The present invention relates generally to signal transmission and reception in a wireless code division multiple access (CDMA) communication system. More specifically, the invention relates to a system and method of transmission using an antenna array to improve signal reception in a wireless CDMA communication system.

BACKGROUND

A prior art CDMA communication system is shown in FIG. 1. The communication system has a plurality of base stations 20-32. Each base station 20 communicates using spread spectrum CDMA with user equipment (UEs) 34-38 within its operating area. Communications from the base station 20 to each UE 34-38 are referred to as downlink communications and communications from each UE 34-38 to the base station 20 are referred to as uplink communications.

Shown in FIG. 2 is a simplified CDMA transmitter and receiver. A data signal having a given bandwidth is mixed by a mixer 40 with a pseudo random chip code sequence producing a digital spread spectrum signal for transmission by an antenna 42. Upon reception at an antenna 44, the data is reproduced after correlation at a mixer 46 with the same pseudo random chip code sequence used to transmit the data. By using different pseudo random chip code sequences, many data signals use the same channel bandwidth. In particular, a base station 20 will communicate signals to multiple UEs 34-38 over the same bandwidth.

For timing synchronization with a receiver, an unmodulated pilot signal is used. The pilot signal allows respective receivers to synchronize with a given transmitter allowing despreading of a data signal at the receiver. In a typical CDMA system, each base station 20 sends a unique pilot signal received by all UEs 34-38 within communicating range to synchronize forward link transmissions. Conversely, in some CDMA systems, for example in the B-CDMA™ air interface, each UE 34-38 transmits a unique assigned pilot signal to synchronize reverse link transmissions.

When a UE 34-36 or a base station 20-32 is receiving a specific signal, all the other signals within the same bandwidth are noise-like in relation to the specific signal. Increasing the power level of one signal degrades all other signals within the same bandwidth. However, reducing the power level too far results in an undesirable received signal quality. One indicator used to measure the received signal quality is the signal to noise ratio (SNR). At the receiver, the magnitude of the desired received signal is compared to the magnitude of the received noise. The data within a transmitted signal received with a high SNR is readily recovered at the receiver. A low SNR leads to loss of data.

To maintain a desired signal to noise ratio at the minimum transmission power level, most CDMA systems utilize some form of adaptive power control. By minimizing the transmission power, the noise between signals within the same bandwidth is reduced. Accordingly, the maximum number of signals received at the desired signal to noise ratio within the same bandwidth is increased.

Although adaptive power control reduces interference between signals in the same bandwidth, interference still exists limiting the capacity of the system. One technique for increasing the number of signals using the same radio frequency (RF) spectrum is to use sectorization. In sectorization, a base station uses directional antennas to divide the base station's operating area into a number of sectors. As a result, interference between signals in differing sectors is reduced. However, signals within the same bandwidth within the same sector interfere with one another. Additionally, sectorized base stations commonly assign different frequencies to adjoining sectors decreasing the spectral efficiency for a given frequency bandwidth. Accordingly, there exists a need for a system which further improves the signal quality of received signals without increasing transmitter power levels.

SUMMARY OF THE INVENTION

A code division multiple access communication system has a base station with a plurality of transmitting antennas. From each transmitting antenna of the base station, a pilot signal is transmitted having a different chip sequence than the other transmitting antenna. At a user equipment, the transmitted pilot signals are received from each transmitting antenna. A weight adjustment is derived in response to the received transmitted pilot signals. The user equipment transmits the weight adjustment to the base station. The transmitted weight adjustment is received from the user equipment. A data signal is processed to produce a plurality of versions of the data signal. At least a portion of each processed data signal has a different chip sequence than the other processed data signal version. At least one processed data signal version is weighted by a weight value adjusted in response to the received transmitted weight adjustment. From each transmitting antenna, a different one of the data signal versions is transmitted and the transmitted data signal versions are received at the user equipment.

DESCRIPTION OF THE PREFERRED EMBODIMENTS

Figure 1:
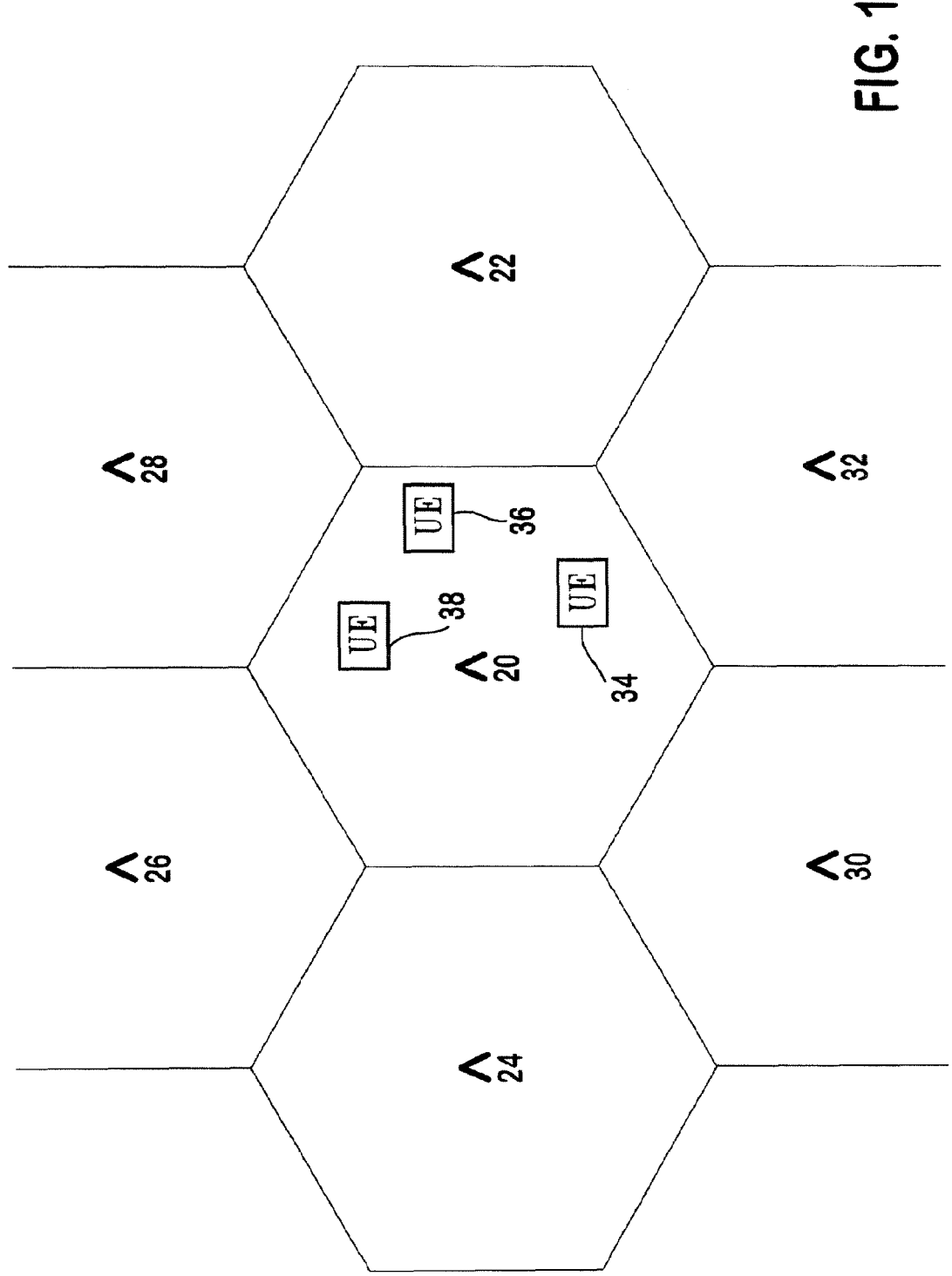
FIG. 1 is a prior art wireless spread spectrum CDMA communication system.
Figure 2:
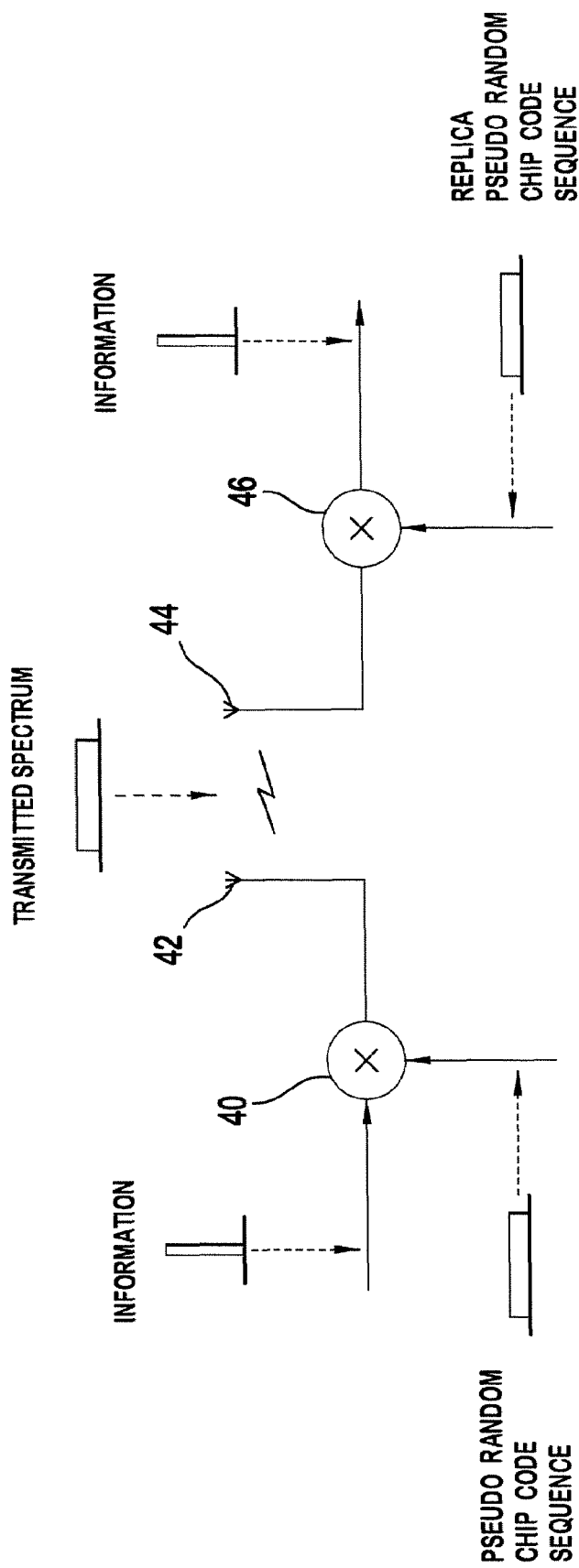
FIG. 2 is a prior art spread spectrum CDMA transmitter and receiver.
Figure 3:
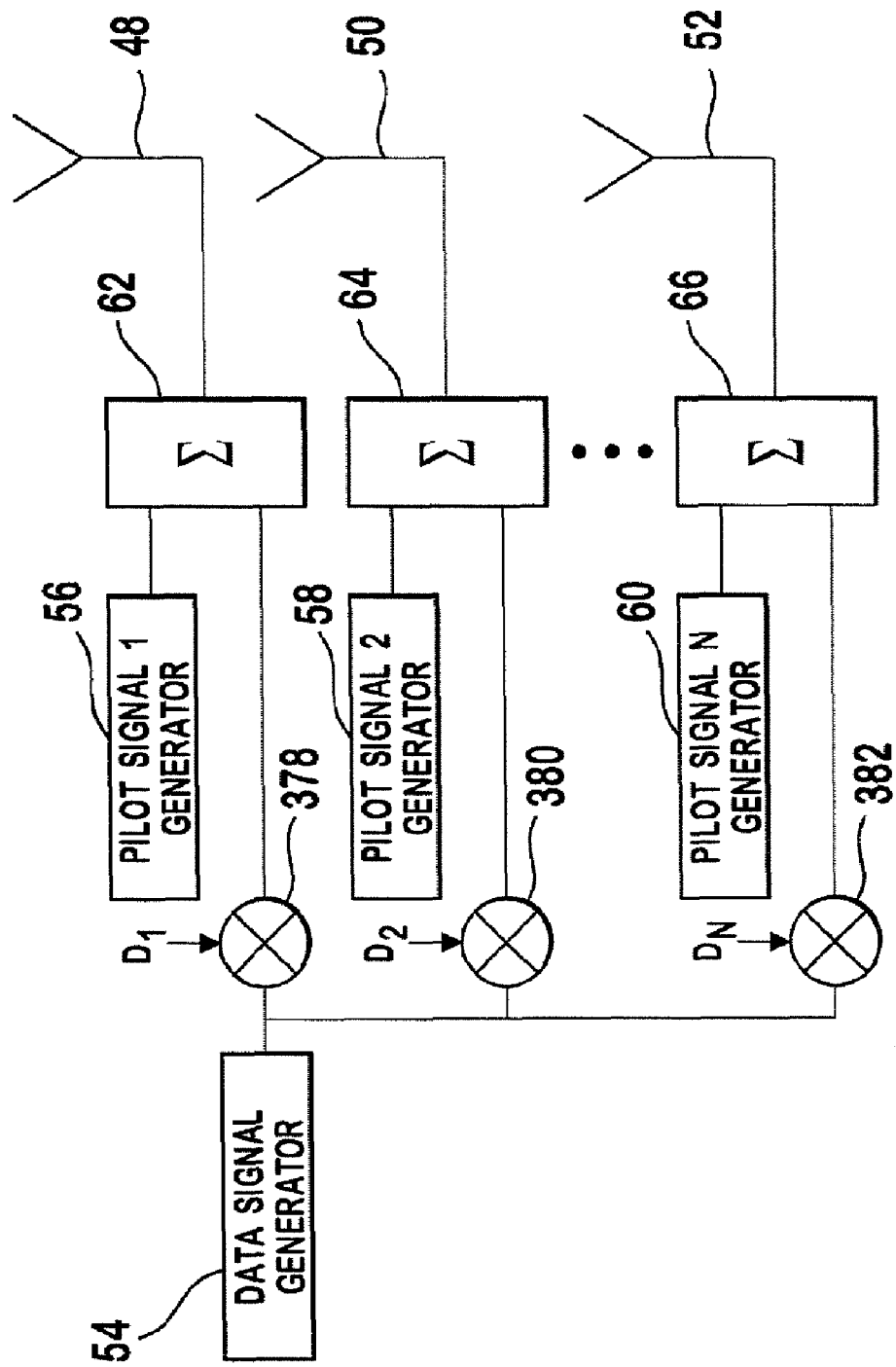
FIG. 3 is the transmitter of the invention.

The preferred embodiments will be described with reference to the drawing figures where like numerals represent like elements throughout. FIG. 3 is a transmitter of the invention. The transmitter has an array of antennas 48-52, preferably 3 or 4 antennas. For use in distinguishing each antenna 48-52, a different signal is associated with each antenna 56-60. The preferred signal to associate with each antenna is a pilot signal as shown in FIG. 3. Each spread pilot signal is generated by a pilot signal generator 56-60 using a different pseudo random chip code sequence and is combined by combiners 62-66 with the respective spread data signal. Each spread data signal is generated using data signal generator 54 by mixing at mixers 378-382 the generated data signal with a different pseudo random chip code sequence per antenna 48-52, $D_1$-$D_N$. The combined signals are modulated to a desired carrier frequency and radiated through the antennas 48-52 of the array.

By using an antenna array, the transmitter utilizes spacial diversity. If spaced far enough apart, the signals radiated by each antenna 48-52 will experience different multipath distortion while traveling to a given receiver. Since each signal sent by an antenna 48-52 will follow multiple paths to a given receiver, each received signal will have many multipath components. These components create a virtual communication channel between each antenna 48-52 of the transmitter and the receiver. Effectively, when signals transmitted by one antenna 48-52 over a virtual channel to a given receiver are fading, signals from the other antennas 48-52 are used to maintain a high received SNR. This effect is achieved by the adaptive combining of the transmitted signals at the receiver.

Figure 4:
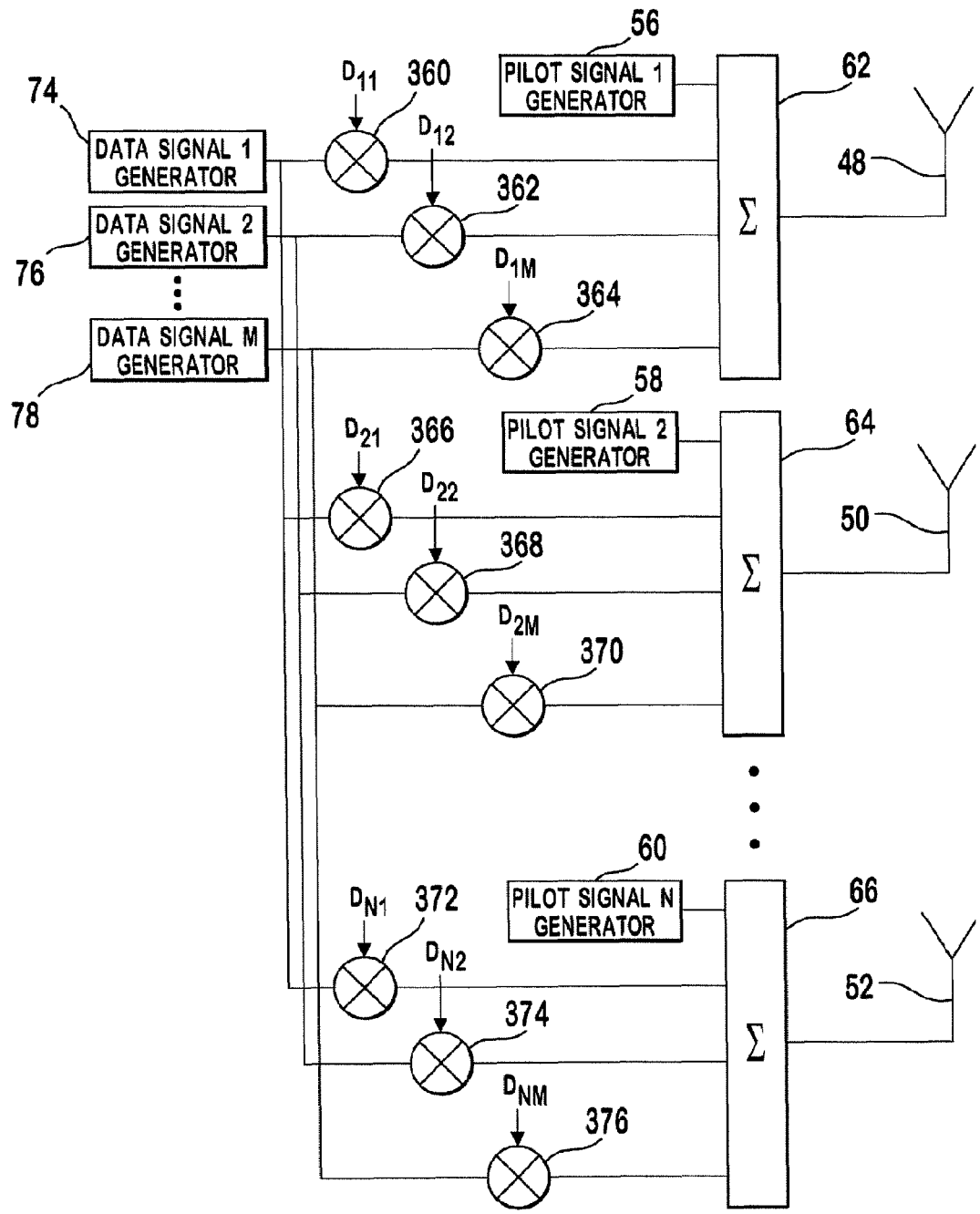
FIG. 4 is the transmitter of the invention transmitting multiple data signals.

FIG. 4 shows the transmitter as used in a base station 20 to send multiple data signals. Each spread data signal is generated by mixing at mixers 360-376 a corresponding data signal from generators 74-78 with differing pseudo random chip code sequences $D_{11}$-$D_{NM}$. Accordingly, each data signal is spread using a different pseudo random chip code sequence per antenna 48-52, totaling N×M code sequences. N is the number of antennas and M is the number of data signals. Subsequently, each spread data signal is combined with the spread pilot signal associated with the antenna 48-52. The combined signals are modulated and radiated by the antennas 48-52 of the array.

Figure 5:
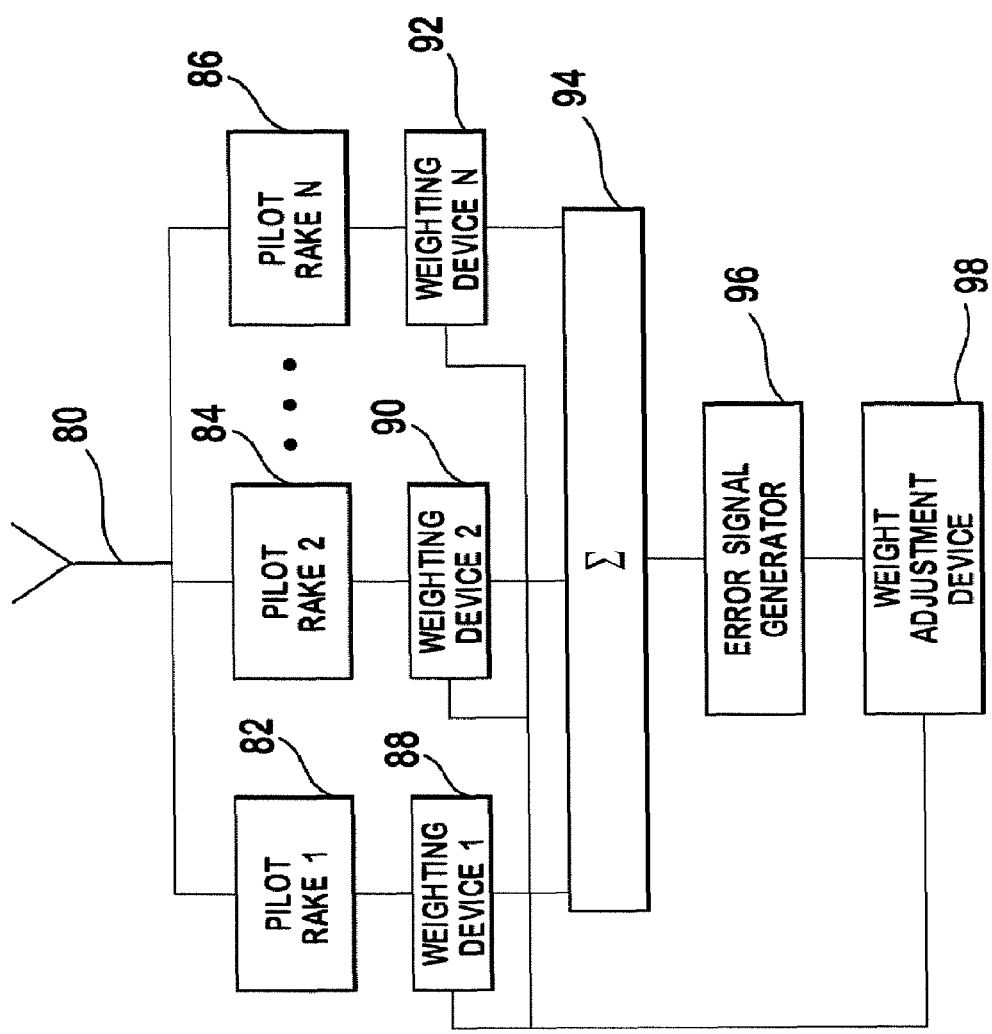
FIG. 5 is the pilot signal receiving circuit of the invention.

The pilot signal receiving circuit is shown in FIG. 5. Each of the transmitted pilot signals is received by the antenna 80. For each pilot signal, a despreading device, such as a RAKE 82-86 as shown in the FIG. 5 or a vector correlator, is used to despread each pilot signal using a replica of the corresponding pilot signal's pseudo random chip code sequence. The despreading device also compensates for multipath in the communication channel. Each of the recovered pilot signals is weighted by a weighting device 88-92. Weight refers to both magnitude and phase of the signal. Although the weighting is shown as being coupled to a RAKE, the weighting device preferably also weights each finger of the RAKE. After weighting, all of the weighted recovered pilot signals are combined in a combiner 94. Using an error signal generator 98, an estimate of the pilot signal provided by the weighted combination is used to create an error signal. Based on the error signal, the weights of each weighting device 88-92 are adjusted to minimize the error signal using an adaptive algorithm, such as least mean squared (LMS) or recursive least squares (RLS). As a result, the signal quality of the combined signal is maximized.

Figure 6:
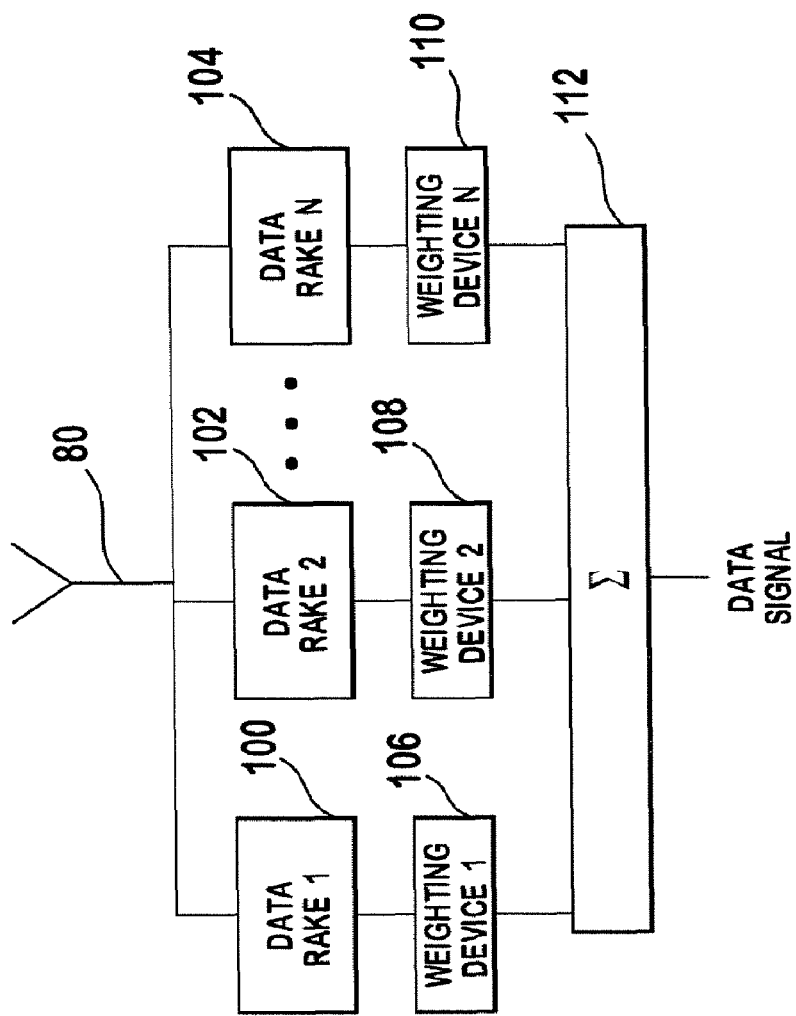
FIG. 6 is the data signal receiving circuit of the invention.

FIG. 6 depicts a data signal receiving circuit using the weights determined by the pilot signal recovery circuit. The transmitted data signal is recovered by the antenna 80. For each antenna 48-52 of the transmitting array, the weights from a corresponding despreading device, shown as a RAKE 82-86, are used to filter the data signal using a replica of the data signal's spreading code used for the corresponding transmitting antenna. Using the determined weights for each antenna's pilot signal, each weighting device 106-110 weights the RAKE's despread signal with the weight associated with the corresponding pilot. For instance, the weighting device 88 corresponds to the transmitting antenna 48 for pilot signal 1. The weight determined by the pilot RAKE 82 for pilot signal 1 is also applied at the weighting device 106 of FIG. 6. Additionally, if the weights of the RAKE's fingers were adjusted for the corresponding pilots signal's RAKE 82-86, the same weights will be applied to the fingers of the data signal's RAKE 100-104. After weighting, the weighted signals are combined by the combiner 112 to recover the original data signal.

By using the same weights for the data signal as used with each antenna's pilot signal, each RAKE 82-86 compensates for the channel distortion experienced by each antenna's signals. As a result, the data signal receiving circuit optimizes the data signals reception over each virtual channel. By optimally combining each virtual channel's optimized signal, the received data signal's signal quality is increased.

Figure 7:
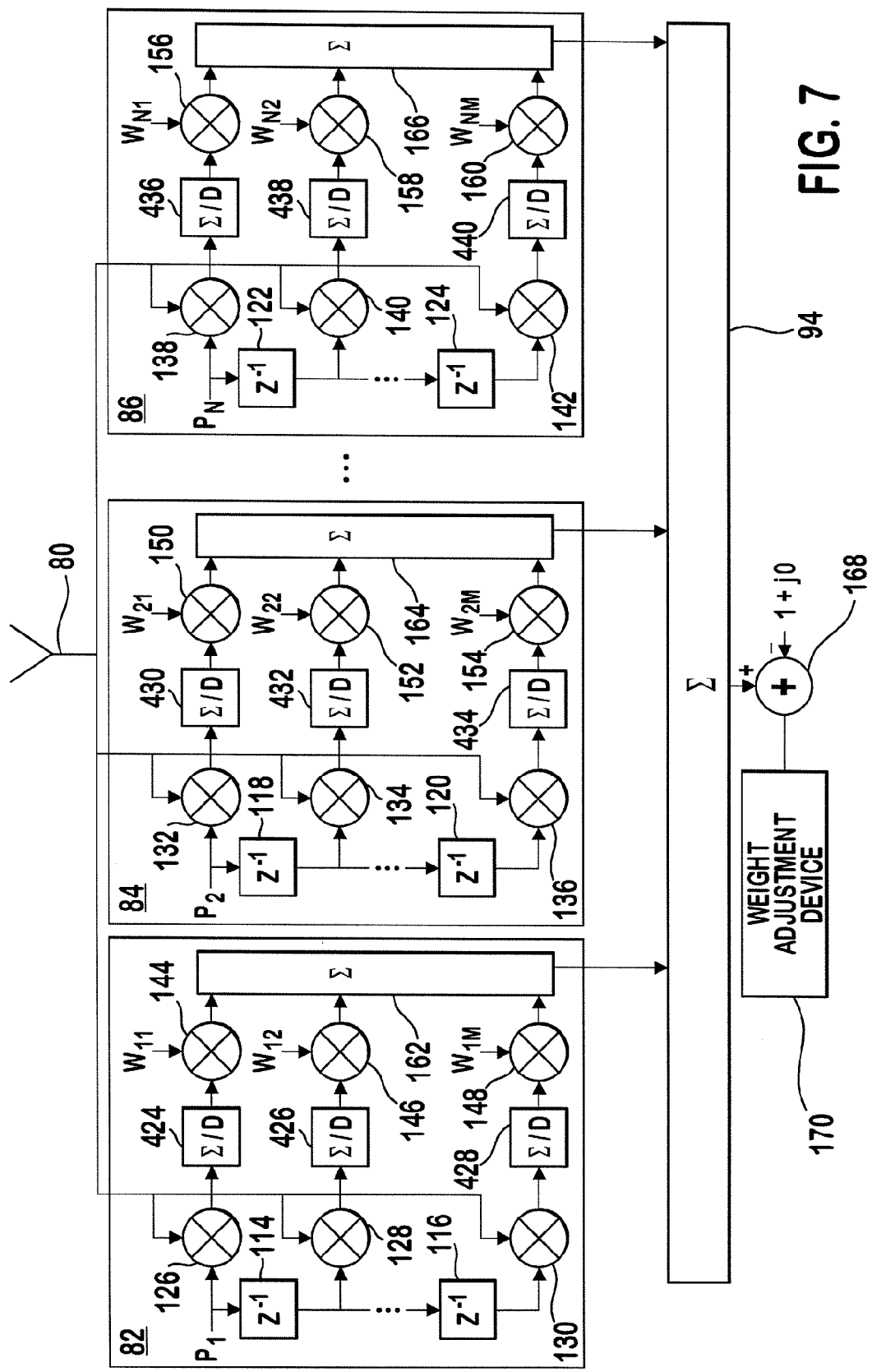
FIG. 7 is an embodiment of the pilot signal receiving circuit.

FIG. 7 shows an embodiment of the pilot signal recovery circuit. Each of the transmitted pilots are recovered by the receiver's antenna 80. To despread each of the pilots, each RAKE 82-86 utilizes a replica of the corresponding pilot's pseudo random chip code sequence, $P_1$-$P_N$. Delayed versions of each pilot signal are produced by delay devices 114-124. Each delayed version is mixed by a mixer 126-142 with the received signal. The mixed signals pass through sum and dump circuits 424-440 and are weighted using mixers 144-160 by an amount determined by the weight adjustment device 170. The weighted multipath components for each pilot are combined by a combiner 162-164. Each pilot's combined output is combined by a combiner 94. Since a pilot signal has no data, the combined pilot signal should have a value of 1+j0. The combined pilot signal is compared to the ideal value, 1+j0, at a subtractor 168. Based on the deviation of the combined pilot signal from the ideal, the weight of the weighting devices 144-160 are adjusted using an adaptive algorithm by the weight adjustment device 170.

Figure 8:
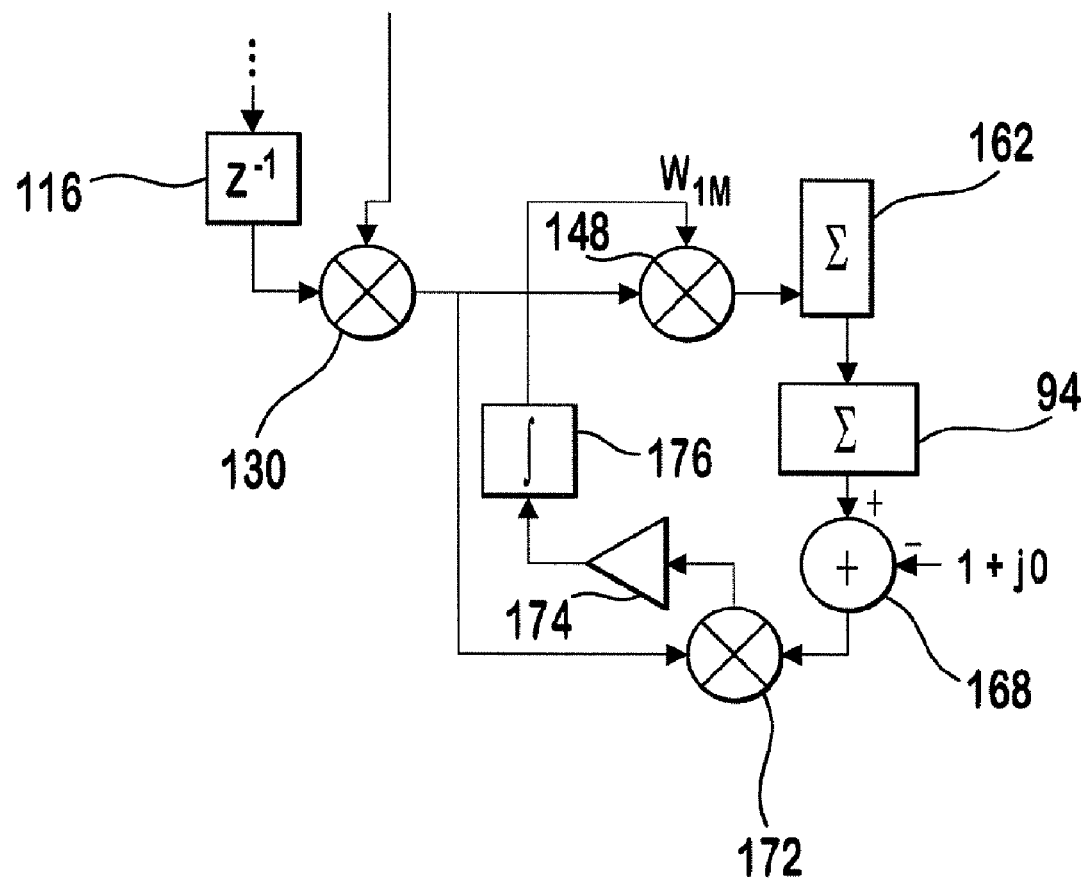
FIG. 8 is a least mean squared weighting circuit.

An LMS algorithm used for generating a weight is shown in FIG. 8. The output of the subtractor 168 is multiplied using a mixer 172 with the corresponding despread delayed version of the pilot. The multiplied result is amplified by an amplifier 174 and integrated by an integrator 176. The integrated result is used to weight, $W_{1M}$, the RAKE finger.

Figure 9:
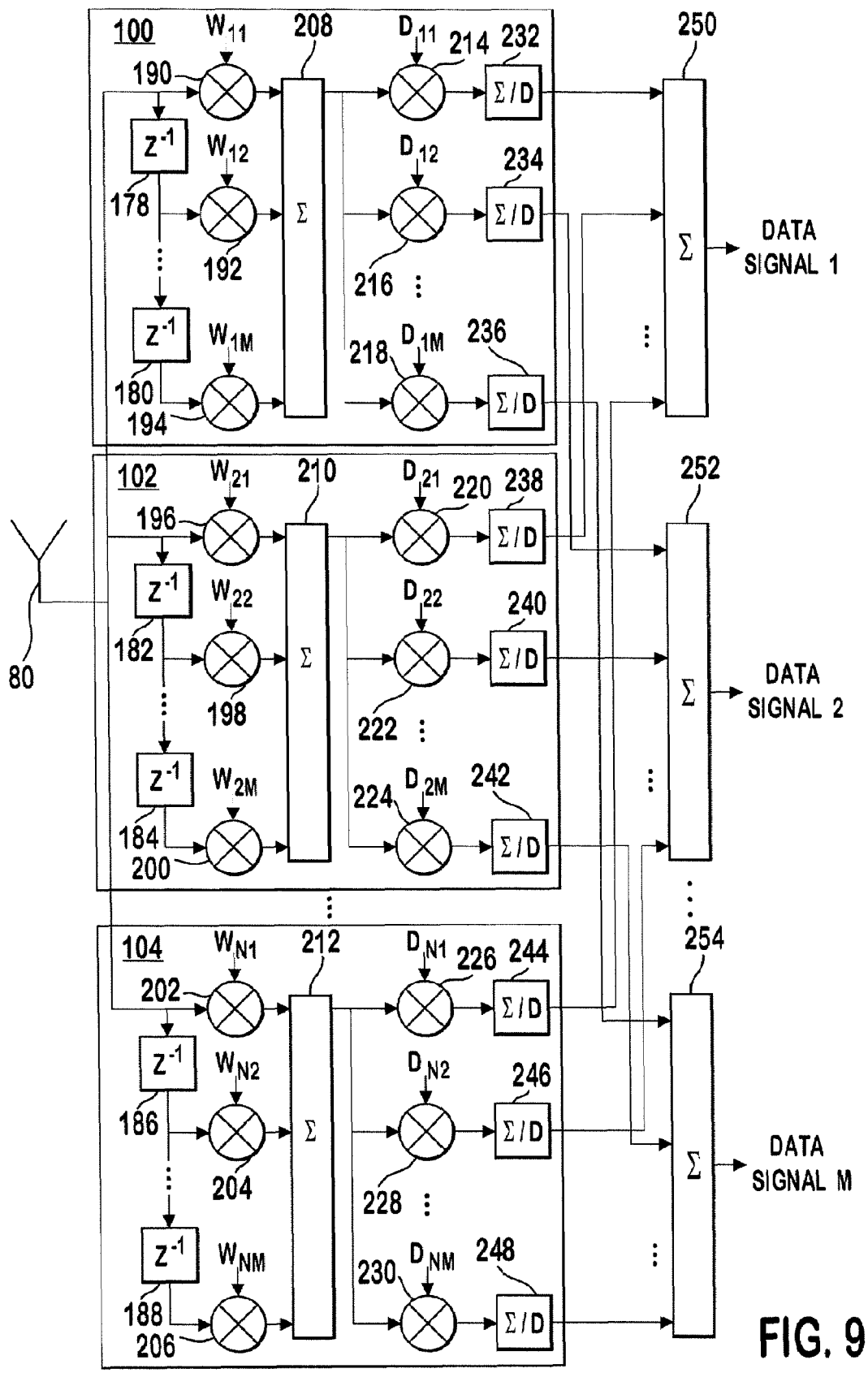
FIG. 9 is the data signal receiving circuit used with the pilot signal receiving circuit of FIG. 7.

The data receiving circuit used with the embodiment of FIG. 7 is shown for a base station receiver in FIG. 9. The received signal is sent to a set of RAKEs 100-104 respectively associated with each antenna 48-52 of the array. Each RAKE 100-104, produces delayed versions of the received signal using delay devices 178-188. The delayed versions are weighted using mixers 190-206 based on the weights determined for the corresponding antenna's pilot signal. The weighted data signals for a given RAKE 100-104 are combined by a combiner 208-212. One combiner 208-212 is associated with each of the N transmitting antennas 48-52. Each combined signal is despread M times by mixing at a mixer 214-230 the combined signal with a replica of the spreading codes used for producing the M spread data signals at the transmitter, $D_{11}$-$D_{NM}$. Each despread data signal passes through a sum and dump circuit 232-248. For each data signal, the results of the corresponding sum and dump circuits are combined by a combiner 250-254 to recover each data signal.

Figure 10:
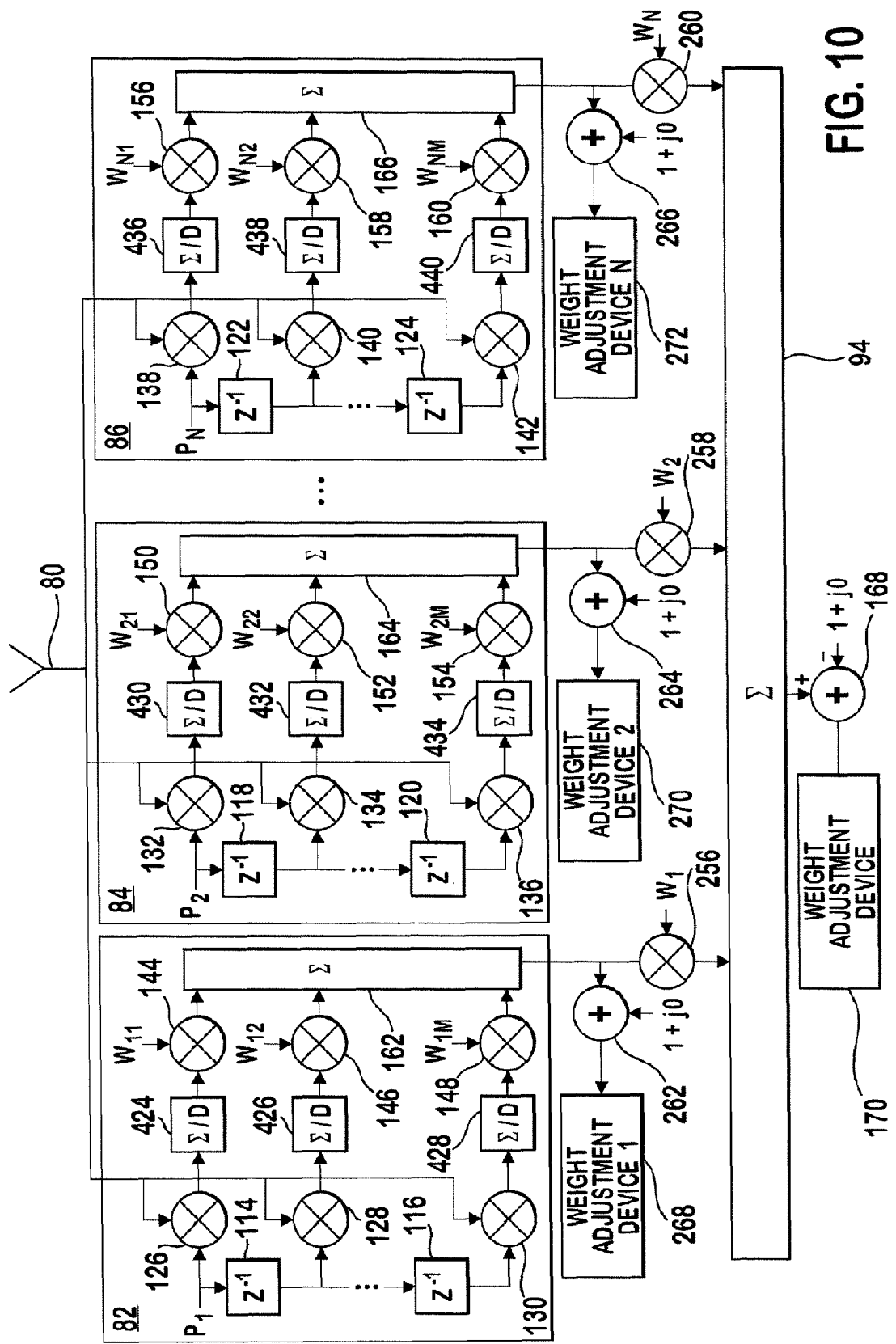
FIG. 10 is an embodiment of the pilot signal receiving circuit where the output of each RAKE is weighted.

Another pilot signal receiving circuit is shown in FIG. 10. The despreading circuits 82-86 of this receiving circuit are the same as FIG. 7. The output of each RAKE 82-86 is weighted using a mixer 256-260 prior to combining the despread pilot signals. After combining, the combined pilot signal is compared to the ideal value and the result of the comparison is used to adjust the weight of each RAKE's output using an adaptive algorithm. To adjust the weights within each RAKE 82-86, the output of each RAKE 82-86 is compared to the ideal value using a subtractor 262-266. Based on the result of the comparison, the weight of each weighting device 144-160 is determined by the weight adjustment devices 268-272.

Figure 11:
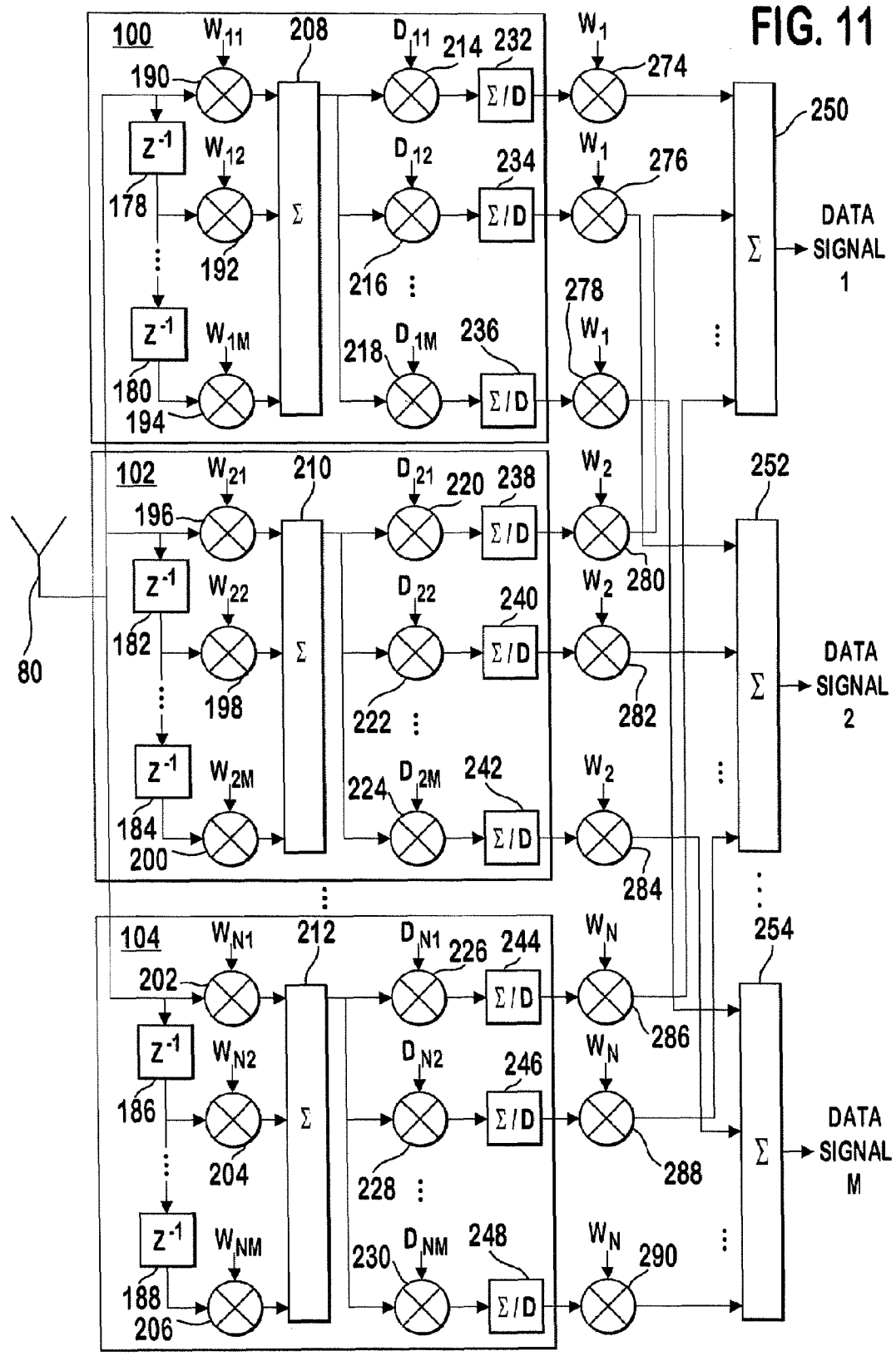
FIG. 11 is the data signal receiving circuit used with the pilot signal receiving circuit of FIG. 10.

The data signal receiving circuit used with the embodiment of FIG. 10 is shown in FIG. 11. This circuit is similar to the data signal receiving circuit of FIG. 9 with the addition of mixers 274-290 for weighting the output of each sum and dump circuit 232-248. The output of each sum and dump circuit 232-248 is weighted by the same amount as the corresponding pilot's RAKE 82-86 was weighted. Alternatively, the output of each RAKE's combiner 208-212 may be weighted prior to mixing by the mixers 214-230 by the amount of the corresponding pilot's RAKE 82-86 in lieu of weighting after mixing.

If the spacing of the antennas 48-52 in the transmitting array is small, each antenna's signals will experience a similar multipath environment. In such cases, the pilot receiving circuit of FIG. 12 may be utilized. The weights for a selected one of the pilot signals are determined in the same manner as in FIG. 10. However, since each pilot travels through the same virtual channel, to simplify the circuit, the same weights are used for despreading the other pilot signals. Delay devices 292-294 produce delayed versions of the received signal. Each delayed version is weighted by a mixer 296-300 by the same weight as the corresponding delayed version of the selected pilot signal was weighted. The outputs of the weighting devices are combined by a combiner 302. The combined signal is despread using replicas of the pilot signals' pseudo random chip code sequences, $P_2$-$P_n$, by the mixers 304-306. The output of each pilot's mixer 304-306 is passed through a sum and dump circuit 308-310. In the same manner as FIG. 10, each despread pilot is weighted and combined.

Figure 12:
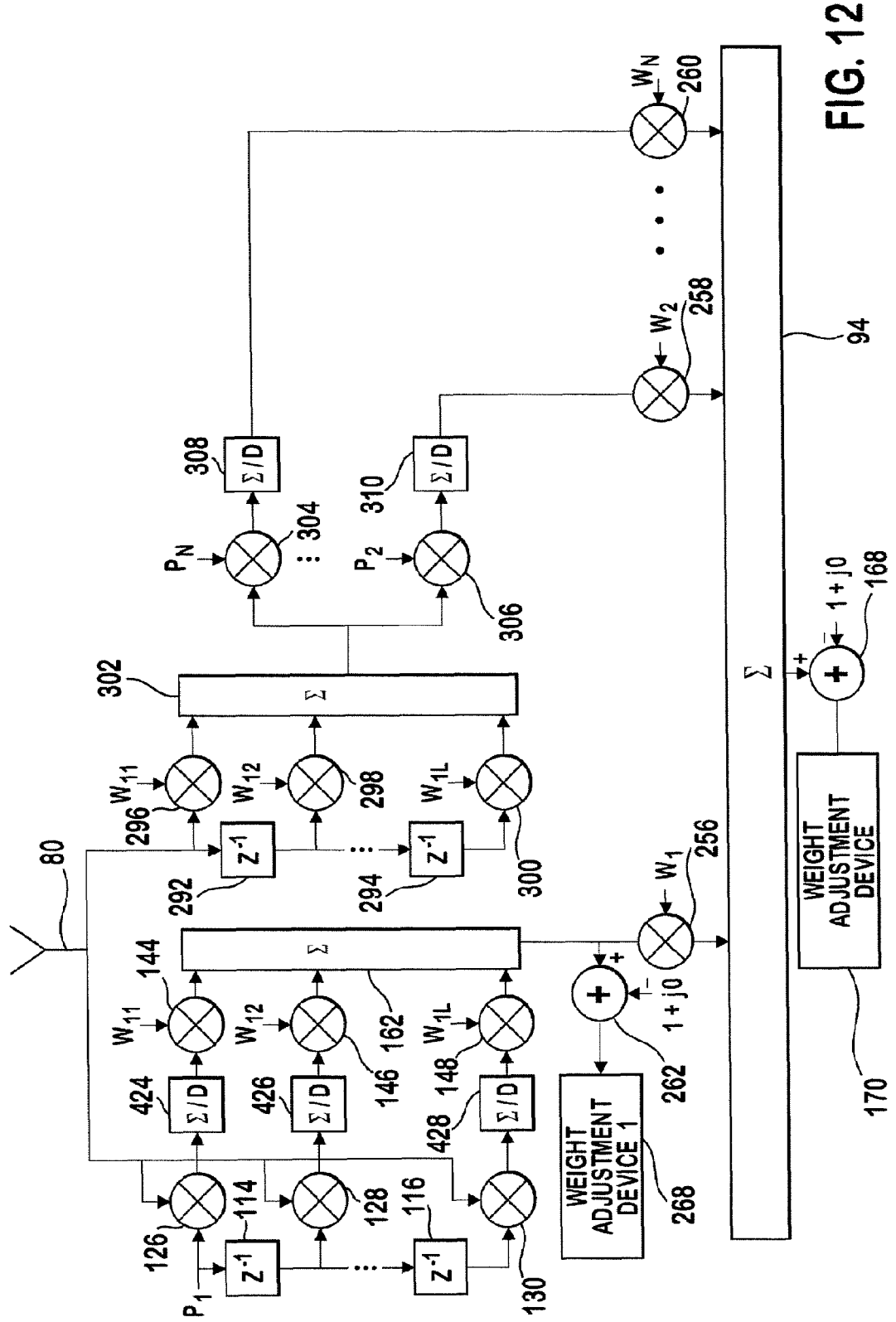
FIG. 12 is an embodiment of the pilot signal receiving circuit where the antennas of the transmitting array are closely spaced.
Figure 13:
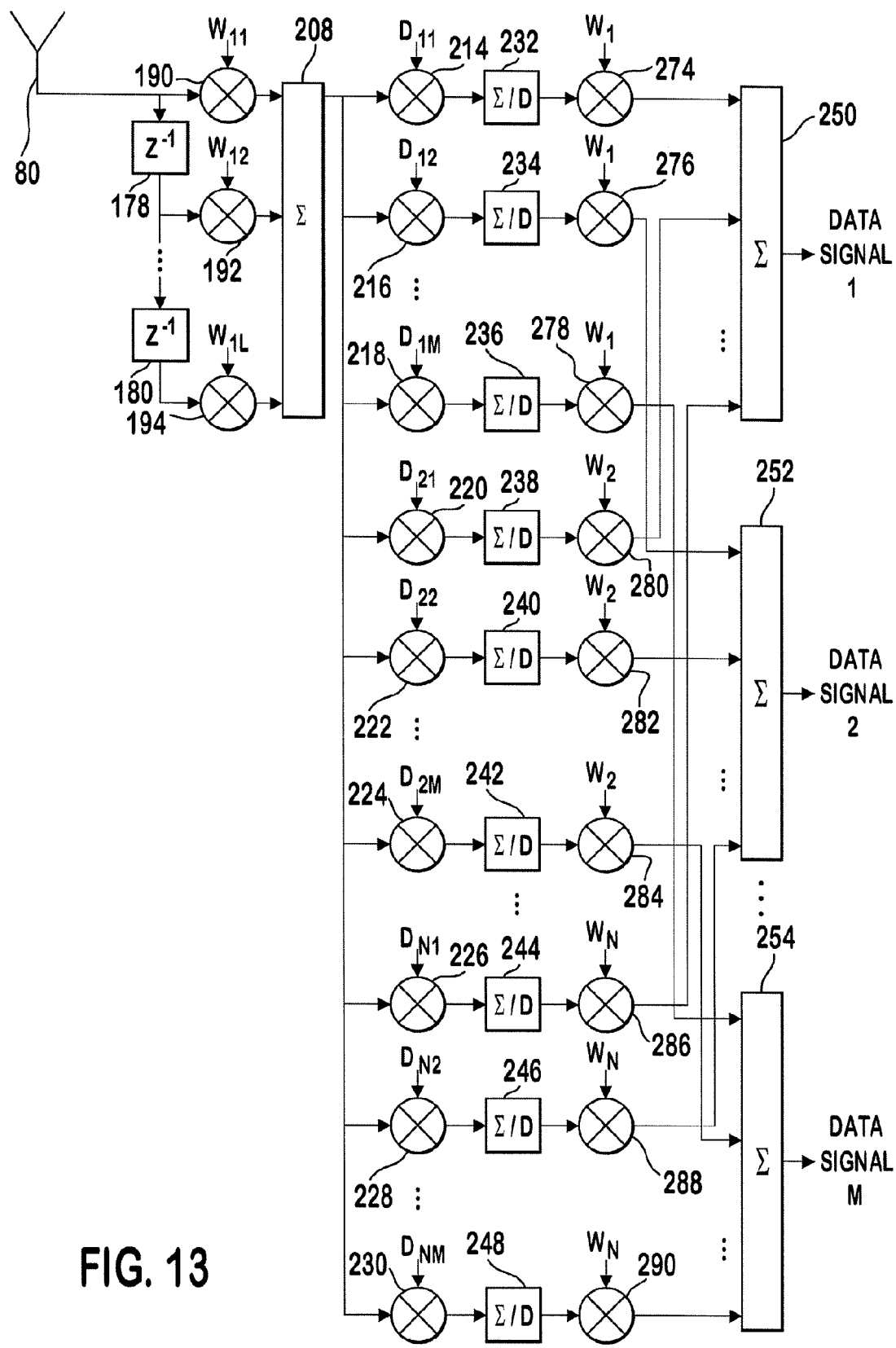
FIG. 13 is the data signal receiving circuit used with the pilot signal receiving circuit of FIG. 12.

The data signal recovery circuit used with the embodiment of FIG. 12 is shown in FIG. 13. Delay devices 178-180 produce delayed versions of the received signal. Each delayed version is weighted using a mixer 190-194 by the same weight as used by the pilot signals in FIG. 12. The outputs of the mixers are combined by a combiner 208. The output of the combiner 208 is inputted to each data signal despreader of FIG. 13.

Figure 14:
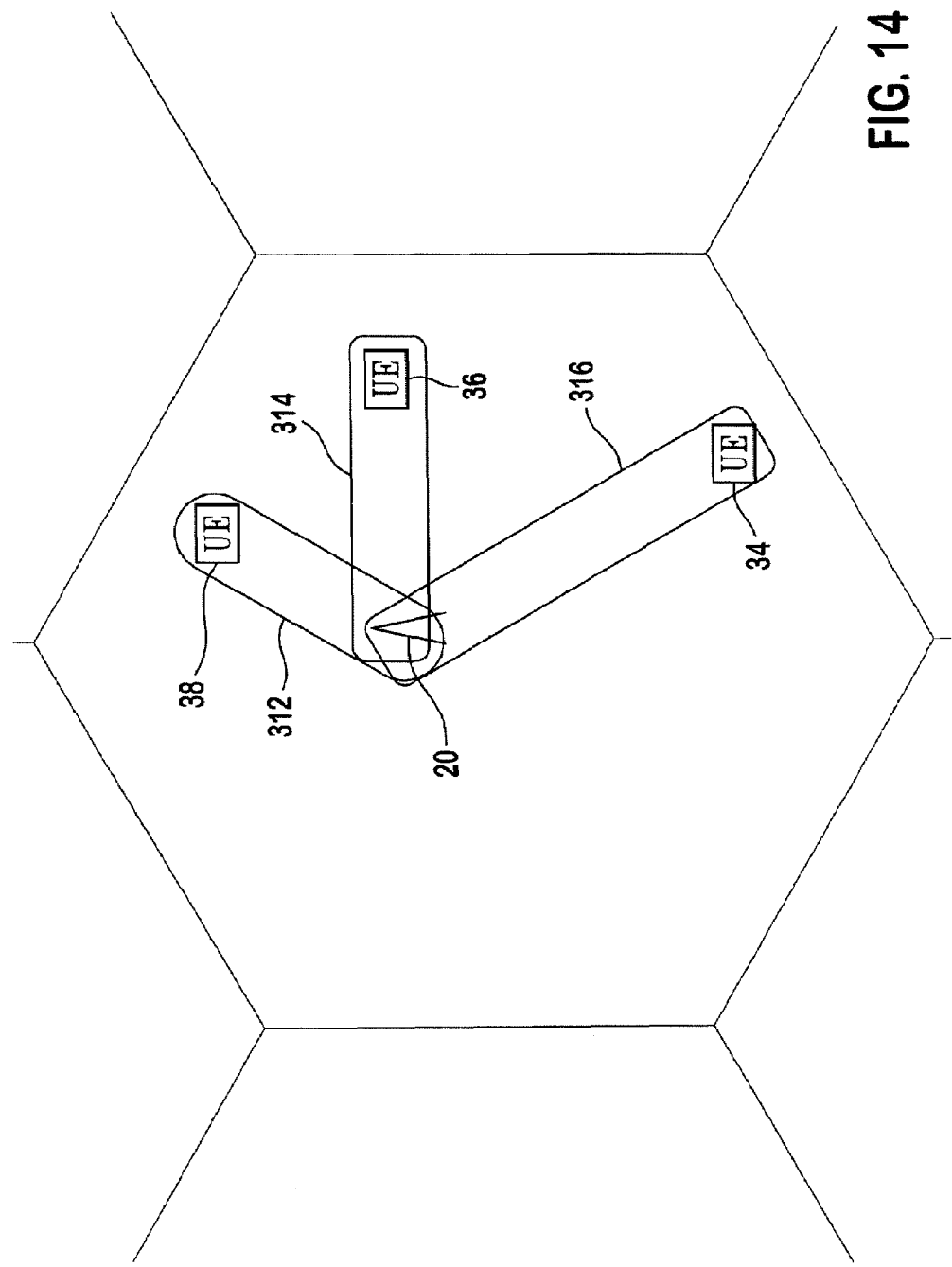
FIG. 14 is an illustration of beam steering in a CDMA communication system.

The invention also provides a technique for adaptive beam steering as illustrated in FIG. 14. Each signal sent by the antenna array will constructively and destructively interfere in a pattern based on the weights provided each antenna 48-52 of the array. As a result, by selecting the appropriate weights, the beam 312-316 of the antenna array is directed in a desired direction.

Figure 15:
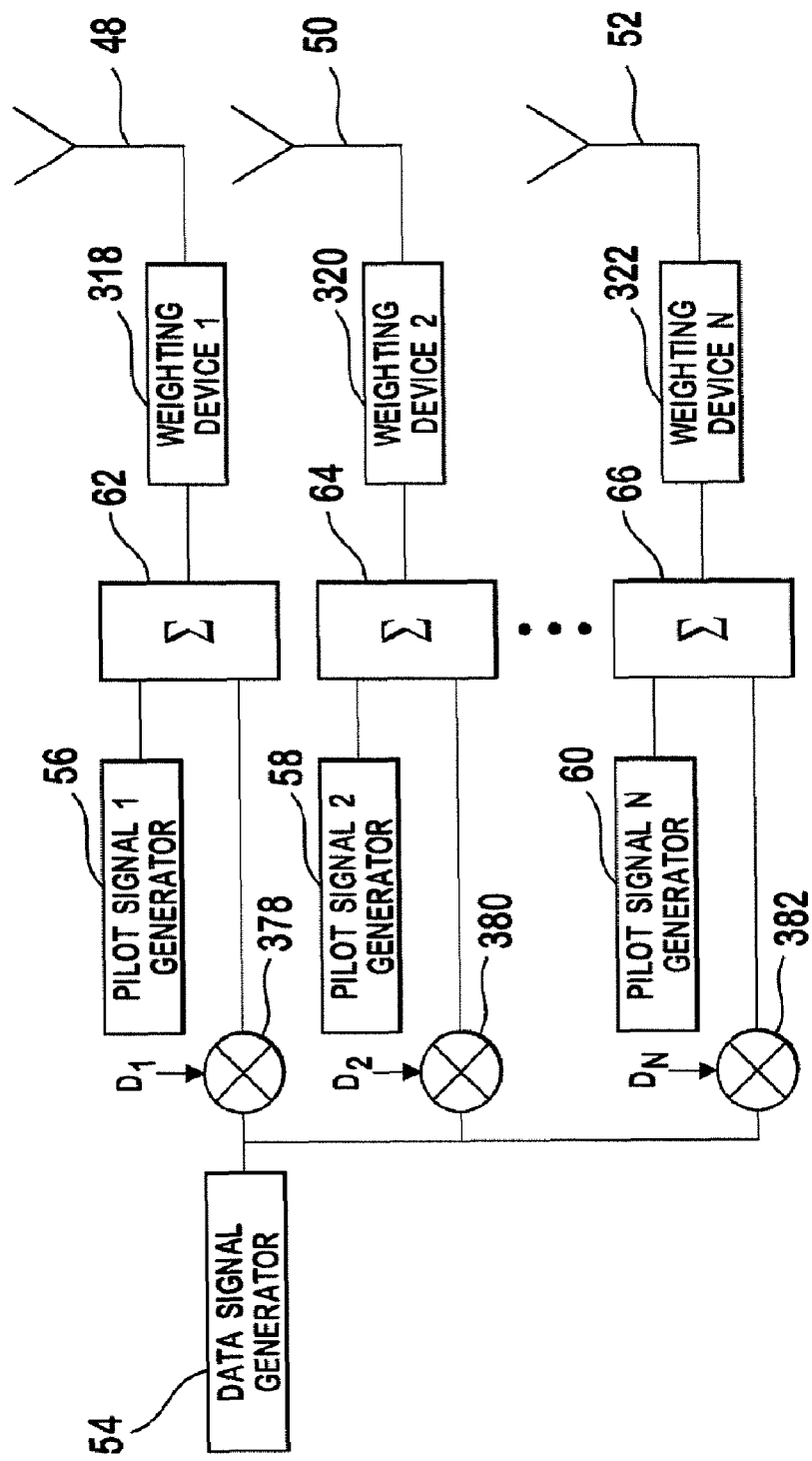
FIG. 15 is a beam steering transmitter.
Figure 16:
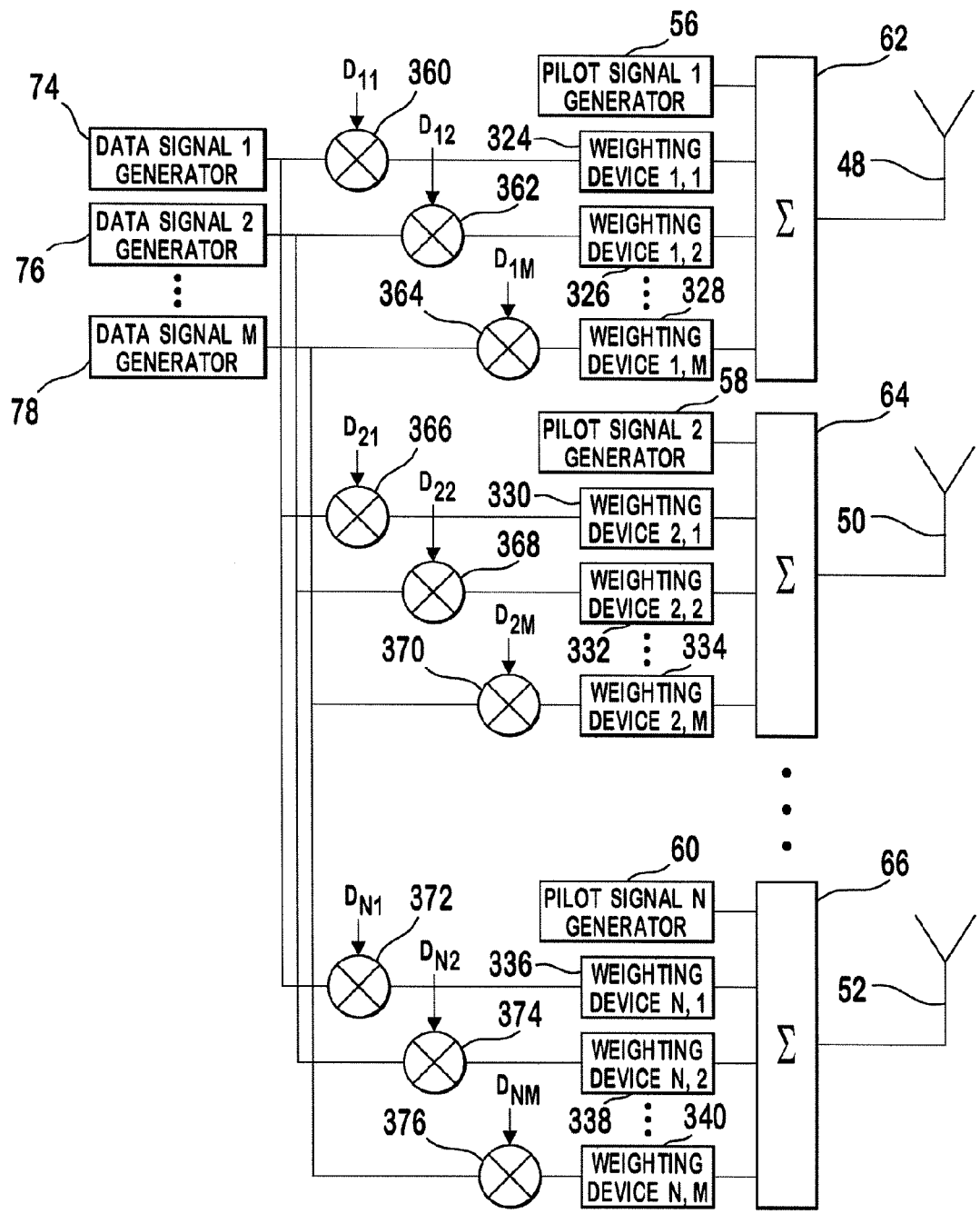
FIG. 16 is a beam steering transmitter transmitting multiple data signals.

FIG. 15 shows the beam steering transmitting circuit. The circuit is similar to the circuit of FIG. 3 with the addition of weighting devices 318-322. A target receiver will receive the pilot signals transmitted by the array. Using the pilot signal receiving circuit of FIG. 5, the target receiver determines the weights for adjusting the output of each pilot's RAKE. These weights are also sent to the transmitter, such as by using a signaling channel. These weights are applied to the spread data signal as shown in FIG. 15. For each antenna, the spread data signal is given a weight by the weighting devices 318-322 corresponding to the weight used for adjusting the antenna's pilot signal at the target receiver providing spatial gain. As a result, the radiated data signal will be focused towards the target receiver. FIG. 16 shows the beam steering transmitter as used in a base station sending multiple data signals to differing target receivers. The weights received by the target receiver are applied to the corresponding data signals by weighting devices 324-340.

Figure 17:
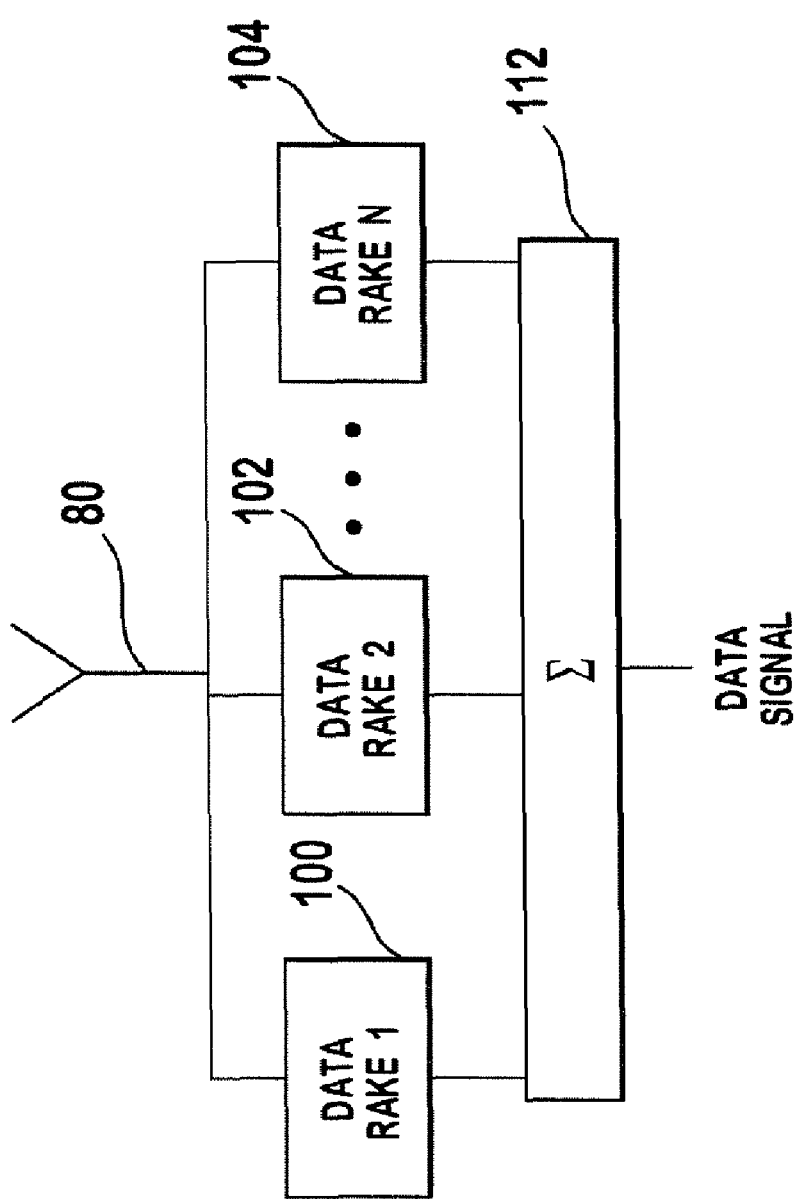
FIG. 17 is the data receiving circuit used with the transmitter of FIG. 14.

FIG. 17 depicts the data signal receiving circuit for the beam steering transmitter of FIGS. 15 and 16. Since the transmitted signal has already been weighted, the data signal receiving circuit does not require the weighting devices 106-110 of FIG. 6.

The advantage of the invention's beam steering are two-fold. The transmitted data signal is focused toward the target receiver improving the signal quality of the received signal. Conversely, the signal is focused away from other receivers reducing interference to their signals. Due to both of these factors, the capacity of a system using the invention's beam steering is increased. Additionally, due to the adaptive algorithm used by the pilot signal receiving circuitry, the weights are dynamically adjusted. By adjusting the weights, a data signal's beam will dynamically respond to a moving receiver or transmitter as well as to changes in the multipath environment.

In a system using the same frequency for downlink and uplink signals, such as time division duplex (TDD), an alternate embodiment is used. Due to reciprocity, downlink signals experience the same multipath environment as uplink signals send over the same frequency. To take advantage of reciprocity, the weights determined by the base station's receiver are applied to the base station's transmitter. In such a system, the base station's receiving circuit of FIG. 18 is co-located, such as within a base station, with the transmitting circuit of FIG. 19.

Figure 18:
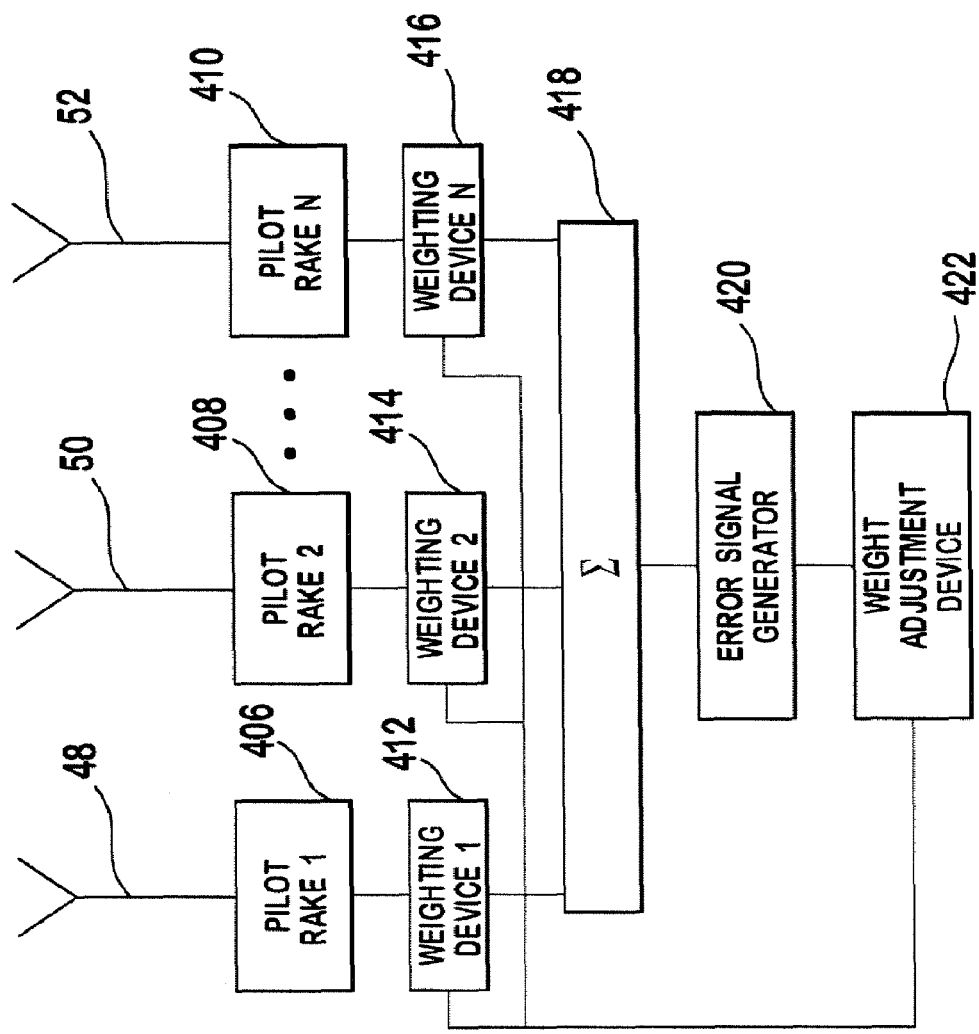
FIG. 18 is a pilot signal receiving circuit used when uplink and downlink signals use the same frequency.

In the receiving circuit of FIG. 18, each antenna 48-52 receives a respective pilot signal sent by the UE. Each pilot is filtered by a RAKE 406-410 and weighted by a weighting device 412-416. The weighted and filtered pilot signals are combined by a combiner 418. Using the error signal generator 420 and the weight adjustment device 422, the weights associated with the weighting devices 412-416 are adjusted using an adaptive algorithm.

Figure 19:
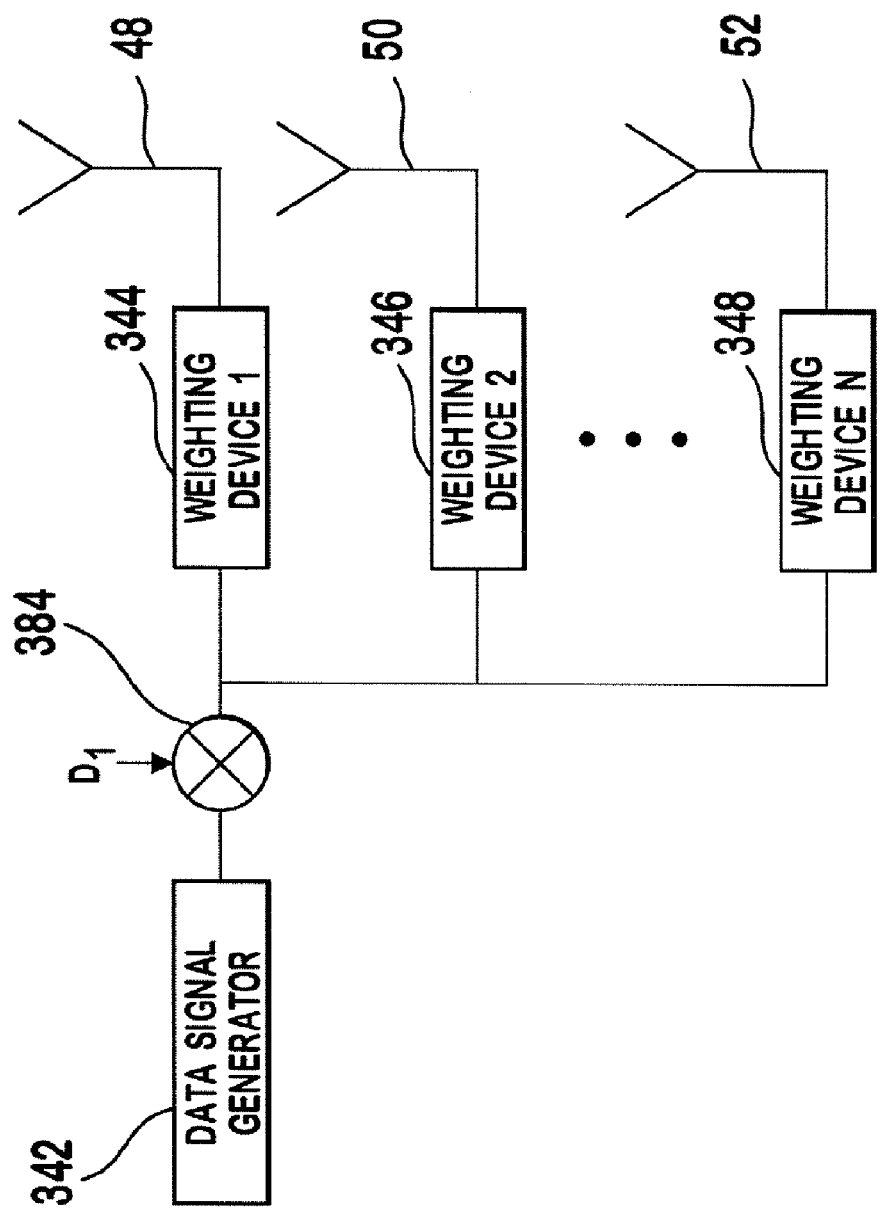
FIG. 19 is a transmitting circuit used with the pilot signal receiving circuit of FIG. 18.

The transmitting circuit of FIG. 19 has a data signal generator 342 to generate a data signal. The data signal is spread using mixer 384. The spread data signal is weighted by weighting devices 344-348 as were determined by the receiving circuit of FIG. 19 for each virtual channel.

Figure 20:
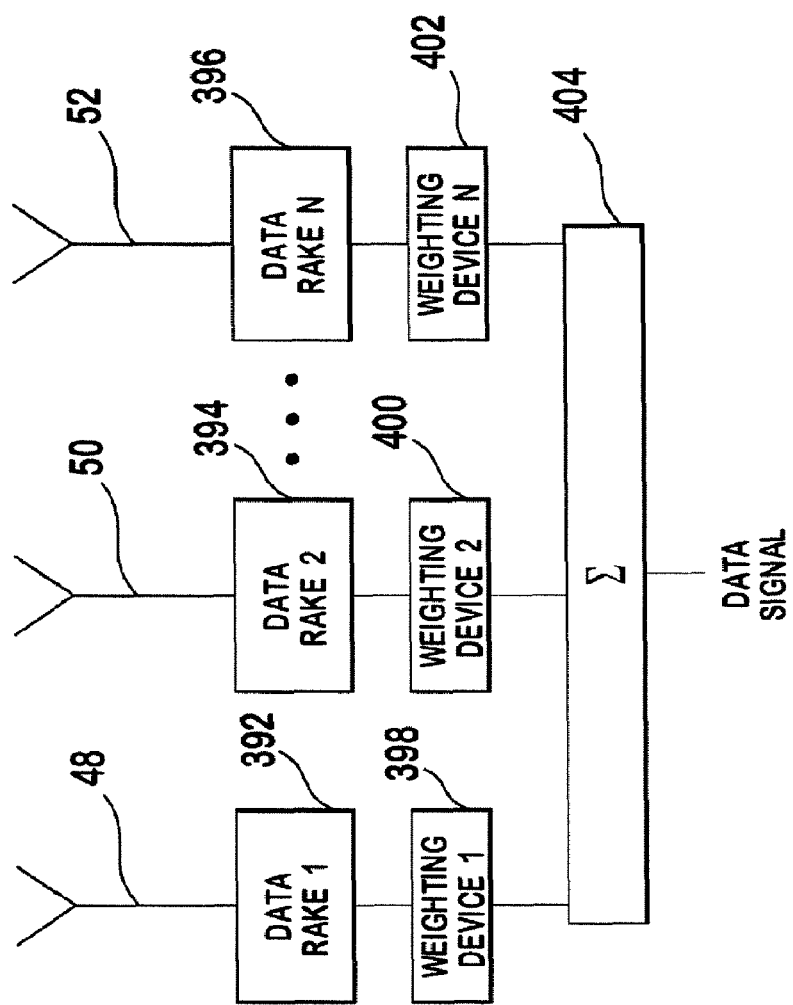
FIG. 20 is a data signal receiving circuit used with the pilot signal receiving circuit of FIG. 18.

The circuit of FIG. 20 is used as a data signal receiving circuit at the base station. The transmitted data signal is received by the multiple antennas 48-52. A data RAKE 392-396 is coupled to each antenna 48-52 to filter the data signal. The filtered data signals are weighted by weighting devices 398-402 by the weights determined for the corresponding antenna's received pilot and are combined at combiner 404 to recover the data signal. Since the transmitter circuit of FIG. 19 transmits the data signal with the optimum weights, the recovered data signal at the UE will have a higher signal quality than provided by the prior art.

What is claimed is:

1. A method for use in a code division multiple access user equipment, the method comprising:
    receiving a first continuous pilot signal from a first transmitting antenna of a base station;
    receiving a second continuous pilot signal from a second transmitting antenna of the base station, wherein the first continuous pilot signal and the second continuous pilot signal have a different chip sequence;
    receiving a data signal comprising two antenna specific chip sequences, wherein each of the antenna specific chip sequences are associated with the respective transmission antenna and the first and second pilot signals have a different channel code than the data signal;
    deriving preferred weights in response to the received first and second continuous pilot signals; and
    combining a data bit associated with the first antenna with a corresponding data bit associated with the second antenna using the preferred weights.

2. The method of claim 1 further comprising weighting the data bit associated with the first antenna with the preferred weights derived from the first pilot signal.

3. The method of claim 1 further comprising weighting the data bit associated with the second antenna with preferred weights derived from the second pilot signal.

4. The method of claim 3 wherein the preferred weights are derived using a least mean square algorithm.

5. The method of claim 1 further comprising filtering the received first and second continuous pilot signals wherein the preferred weights are derived from the filtered received first and second pilot signals.

6. The method of claim 1 wherein the received first and second data signal are distinguished by the portion of the first and second data signal having the different chip sequence.

7. A code division multiple access user equipment, the user equipment comprising:
    a receiving circuit configured to receive a plurality of continuous pilot signals, each continuous pilot signal having a different chip sequence than others of the plurality of continuous pilot signals;
    a weight calculation device configured to derive preferred weights in response to the received pilot signals;
    the receiving circuit configured to receive a plurality of data signals, at least a portion of each data signal has a different antenna specific chip sequence than others of the plurality of data signals, the receiving circuit configured to filter the received data signals to recover data; and
    circuitry configured to combine a data bit associated with a first antenna specific chip sequence with a corresponding data bit associated with a second antenna specific chip sequence using the preferred weight.

8. The user equipment of claim 7 further comprising: circuitry configured to weight the data bit associated with the first antenna with the preferred weights derived from the first pilot signal.

9. The user equipment of claim 7 further comprising circuitry configured to weight the data bit associated with the second antenna with preferred weights derived from the second pilot signal.

10. The user equipment of claim 7 wherein the plurality of pilot signals and the plurality of data signals are configured to be received from a same base station.

11. The user equipment of claim 7 wherein the preferred weights are derived using an adaptive algorithm.

12. The user equipment of claim 11 wherein the adaptive algorithm is a least mean square algorithm.

13. The user equipment of claim 7 wherein the receiving circuit is configured to filter the received continuous pilot signals; wherein the weight adjustment device is configure to derive the preferred weights from the filtered received continuous pilot signals.

14. The user equipment of claim 7 wherein the receiving circuit is configured to distinguish the received data signal versions using the at least the portion of each processed data signal having the different chip sequence.

* * * * *